US011523362B2

(12) United States Patent
Park et al.

(10) Patent No.: US 11,523,362 B2
(45) Date of Patent: Dec. 6, 2022

(54) APPARATUS IN SYNCHRONIZATION SYSTEM AND METHODS FOR OPERATING THE SAME

(71) Applicant: Samsung Electronics Co., Ltd., Suwon-si (KR)

(72) Inventors: Jinsoo Park, Suwon-si (KR); Hyunpyo Lee, Suwon-si (KR); Byoungkon Park, Suwon-si (KR); Jaeyoon Lee, Suwon-si (KR); Seungpyo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 16/733,650

(22) Filed: Jan. 3, 2020

(65) Prior Publication Data

US 2020/0221409 A1    Jul. 9, 2020

(30) Foreign Application Priority Data

Jan. 3, 2019    (KR) .................. 10-2019-0000809

(51) Int. Cl.
*H04W 56/00* (2009.01)
(52) U.S. Cl.
CPC ..... *H04W 56/005* (2013.01); *H04W 56/0075* (2013.01)
(58) Field of Classification Search
CPC .................. H04W 56/005; H04W 46/0075
See application file for complete search history.

(56) References Cited

U.S. PATENT DOCUMENTS

| 5,293,380 | A | * | 3/1994 | Kondo | ................. H04B 7/2696 370/337 |
| 5,805,983 | A | | 9/1998 | Naidu et al. | |
| 5,953,384 | A | | 9/1999 | Walsh et al. | |
| 6,320,507 | B1 | * | 11/2001 | Strzelec | ............. G08B 13/2488 340/572.1 |

OTHER PUBLICATIONS

European Office Action dated Jan. 14, 2021, issued in European Patent Application No. 20150172.3.
Extended European Search Report dated Apr. 29, 2020, issued in European Patent Application No. 20150172.3.

* cited by examiner

*Primary Examiner* — Curtis B Odom
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The disclosure is A first apparatus for estimating a delay time in a synchronization system is provided. The first apparatus includes a detector configured to detect a request signal generated by a second apparatus, and a generator configured to generate a response signal corresponding to the request signal and output the response signal. The request signal is received through a cable from the second apparatus and the response signal is transmitted to the second apparatus through the cable.

10 Claims, 14 Drawing Sheets

APPARATUS IN SYNCHRONIZATION SYSTEM AND METHODS FOR OPERATING THE SAME

CROSS-REFERENCE TO RELATED APPLICATION(S)

This application is based on and claims priority under 35 U.S.C. § 119(a) to Korean patent application number 10-2019-0000809, filed on Jan. 3, 2019, in the Korean Intellectual Property Office, the disclosure of which is incorporated by reference herein in its entirety.

BACKGROUND

1. Field

The disclosure relates to a synchronization system. More particularly, the disclosure relates to an apparatus in a synchronization system and methods for operating.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System.'

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A 5G system and existing cellular systems require synchronization among base stations (BSs). In detail, the required accuracy of synchronization may depend on systems, but it is required to use time-synchronized clock signals among BSs. In general, a global navigation satellite system (GNSS) signal is used for synchronization among BSs. The GNSS signal is a weak signal that is transmitted to a user on the ground from a GNSS satellite being apart over several tens of thousands of kilometers, so a separate antenna device that is installed outdoor may be used for a reception device to normally receive the GNSS signal. In this case, the reception device and the antenna device may be connected to a cable (e.g., a coaxial cable). However, using a cable may cause a delay until the GNSS signal received by the antenna device reaches the reception device, and the accuracy in synchronization may be decreased due to the delay.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for estimating a delay time between an antenna device and a reception device in a synchronization system.

Another aspect of the disclosure is to provide an apparatus and method for estimating a delay time that is generated in a cable between an antenna device and a reception device in a synchronization system.

Additional aspects will be set forth in part in the description which follows and, in part, will be apparent from the description, or may be learned by practice of the presented embodiments.

In accordance with an aspect of the disclosure, a first apparatus for estimating a delay time in a synchronization system is provided. The first apparatus includes detector configured to detect a request signal generated by a second apparatus, and a generator configured to generate a response signal corresponding to the request signal and to output the response signal. The request signal may be received through a cable from the second apparatus and the response signal may be transmitted to the second apparatus through the cable.

In accordance with another aspect of the disclosure, a second apparatus for estimating a delay time in a synchronization system is provided. The second apparatus includes an output part configured to output a request signal that request a response signal that is generated by a first apparatus, and a detector configured to estimate the delay time, based on the request signal and the response signal. The request signal may be transmitted to the first apparatus through a cable and the response signal may be received to the second apparatus from the first apparatus through the cable.

In accordance with another aspect of the disclosure, a method of operating a first apparatus for estimating a delay time in a synchronization system is provided. The method includes detecting a request signal generated by a second apparatus, generating a response signal corresponding to the request signal, and outputting the response signal. The request signal may be received through a cable from the second apparatus and the response signal may be transmitted to the second apparatus through the cable.

In accordance with another aspect of the disclosure, a method of operating a second apparatus for estimating a delay time in a synchronization system is provided. The method includes outputting a request signal that request a response signal that is generated by a first apparatus, and estimating the delay time, based on the request signal and the response signal. The request signal may be transmitted to the first apparatus through a cable and the response signal may be received to the second apparatus from the first apparatus through the cable.

The apparatus and method according to various embodiments can improve accuracy of synchronization by estimating a delay time generated in a cable between an antenna device and a reception device in a synchronization system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
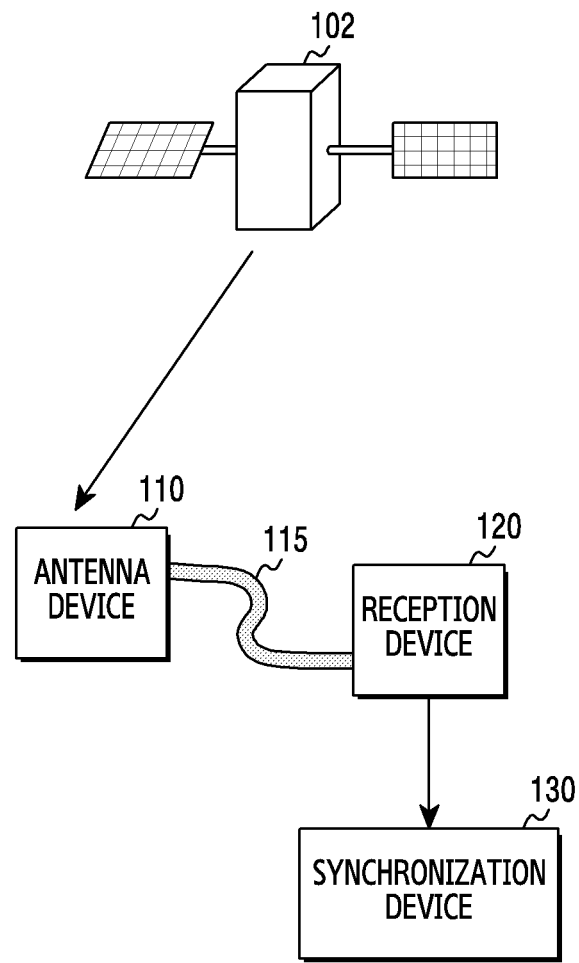
FIG. 1 shows a synchronization system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereafter, the disclosure relates to an apparatus and method for estimating a delay time in a synchronization system. In detail, the disclosure relates to a technology for more effectively estimating a delay time that is generated in a cable between an antenna device and a reception device in a synchronization system having a structure in which the antenna device and the reception device are separated.

Terms indicating signals, terms indicating systems or entities, terms indicating components of devices, etc. that are used hereafter are exemplified for the convenience of description. Accordingly, the disclosure is not limited to the terms to be described hereafter and other terms having equivalent meanings may be used.

Various embodiments are described herein using the terms, which are used in some communication standards (e.g., 3rd generation partnership project (3GPP), but they are only examples for description. Various embodiments of the disclosure may be easily modified to be applied to other communication systems.

Hereafter, various embodiments that can be applied to a synchronization system are described. The synchronization system, which is a set of devices that extracts time synchronization from an external signal, can provide synchronization signals (SSs) to various systems that require synchronization. For example, a system that requires synchronization may be a cellular communication system.

However, the disclosure is not limited to a cellular communication system and may be applied to other systems that use an SS.

FIG. 1 shows an apparatus and method for estimating a delay time in a synchronization system according to an embodiment of the disclosure.

Referring to FIG. 1, a synchronization system includes an antenna device 110, a reception device 120, and a synchronization device 130.

The antenna device 110 receives an external signal, for example, a satellite signal transmitted from a satellite 102. The satellite signal may be referred to as a global navigation satellite system (GNSS) signal. The antenna device 110 may be installed outdoors and can amplify and then provide a received satellite signal to the reception device 120. The satellite signal is transmitted from the antenna device 110 to the reception device 120 through a cable 115. To this end, the antenna device 110 may include at least one antenna, at least one filter, at least one amplification circuit, or at least one port.

The reception device 120 generates a synchronization signal (SS) using a satellite signal. For example, the SS may include a 1 pulse per second (PPS) signal. The SS is provided to the synchronization device 130. To this end, the reception device 120 may include at least one terminal and at least one signal processing circuit. According to various embodiments, the reception device 120 can estimate a delay of a satellite signal due to the cable 115. Information about the estimated delay may be provided to the synchronization device 130 or may be used to generate an SS.

The synchronization device 130 generates a clock signal that is used in an external system, based on an SS. In detail, the synchronization device 130 can generate a clock signal at a needed frequency by dividing an SS. Depending on cases, the synchronization device may be understood as a part of an external system that requires synchronization.

In the synchronization system shown in FIG. 1, when the antenna device 110 and the reception device 120 are adjacent to each other, the synchronization system is implemented in a single equipment, the time that is needed to transmit a satellite signal between the antenna device 110 and the reception device 120 may be negligibly small. However, when the antenna device 110 is installed outdoors and the reception device 120 is disposed indoors to receive a satellite signal, the cable 115 (e.g., a coaxial cable) may be used as a path for transmitting the satellite signal. In this case, a delay shown in FIG. 2 may be generated.

Figure 2:
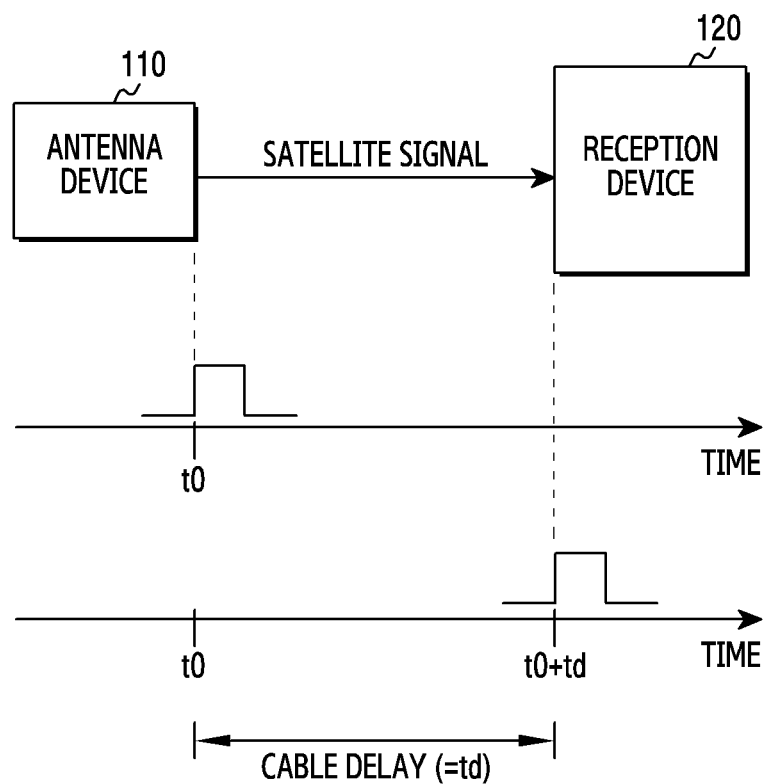
FIG. 2 shows a delay time that is generated in a synchronization system according to an embodiment of the disclosure.

FIG. 2 shows a delay time that is generated in a synchronization system according to an embodiment of the disclosure.

Referring to FIG. 2, a satellite signal is received by the antenna device 110 at time t0. However, while the satellite signal is transmitted to the reception device 120 through a cable (e.g., the cable 115), a cable delay of td may be generated.

The delay time in a cable depends on the length and characteristics of the installed cable. For example, if a cable has a characteristic that a delay of 5 ns is generally generated per 1 m, a delay of 500 ns can be generated when the cable is installed in a length of 100 m. This means that an error of about 500 ns is generated even if the reception device 120 does not generate an error. When there is a plurality of synchronization systems that provides an SS or clock signal to different devices (e.g., different base stations (BSs)), the phases of SSs or clock signals may be different due to a difference in length or a characteristic of installed cables. Accordingly, a technology of correcting a time error due to a delay that is generated in a cable is required to satisfy SS accuracy that is required by systems.

The synchronization system according to various embodiments includes a delay detection module that estimates a delay time generated between the antenna device 110 and the reception device 120, and a response module that generates a signal responding to a signal that is output from the delay detection module. The delay detection module and the response module are installed to be connected directly or indirectly to an end and the other end of a cable (e.g., the cable 115). Hereafter, the configurations of the delay detection module and the response module are described with reference to FIGS. 3A and 3B.

Figure 3A:
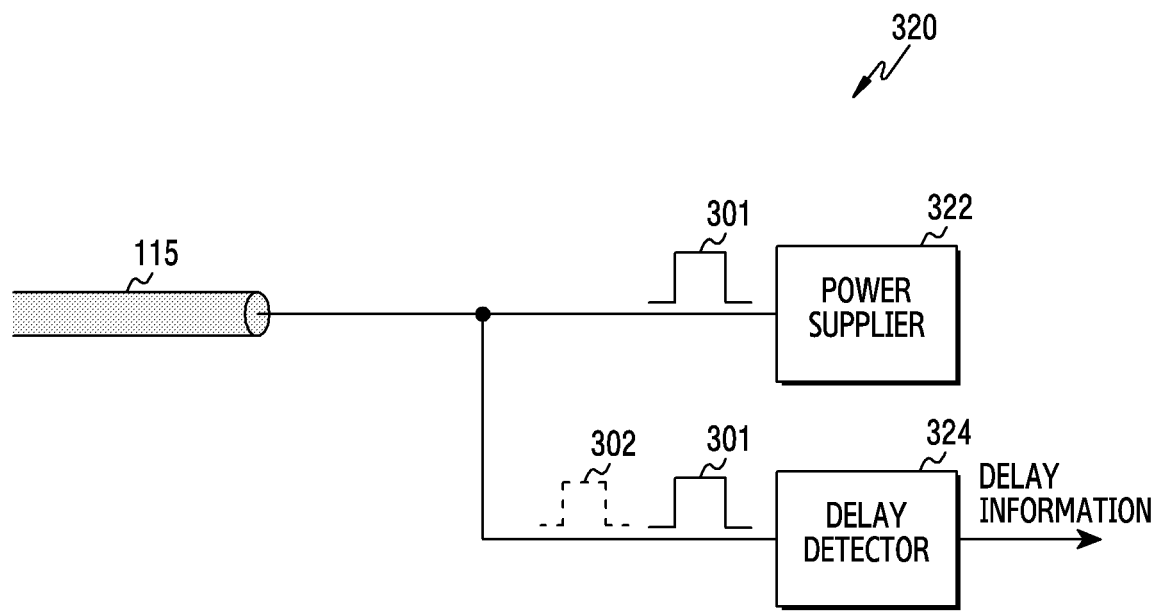
FIG. 3A shows the configuration of a delay detection module in a synchronization system according to an embodiment of the disclosure.

FIG. 3A shows a configuration of a delay detection module in a synchronization system according to an embodiment of the disclosure.

Referring to FIG. 3A, a delay detection module 320 includes a power supplier 322 and a delay detector 324.

The power supplier 322 outputs a power signal. To this end, the power supplier 322 may be connected to an external power. According to an embodiment, the power supplier 322 can generate a request signal 301 that indicates a pre-defined length. The request signal 301 may have a single pulse shape with a pre-defined length. The request signal 301 generated from the power supplier 322 is transmitted through the cable 115. The request signal 301 is provided to the delay detector 324. Signal paths that are formed by the cable 115 include a first path for a satellite signal and a second path for a power signal. The request signal 301 is transmitted through the second path rather than a specific control path, so it may be understood as a type of power signal.

The delay detector 324 estimates a delay time that is generated in the cable 115. According to an embodiment, the delay detector 324 can estimate a delay time, based on the request signal 301 and a response signal 302 corresponding to the request signal 301. The response signal 302 is a signal generated by a responder as a response for the request signal 301 transmitted through the cable 115. Accordingly, a time difference between the falling edge of the request signal 301 and the rising edge of the response signal 302 may be understood as including a signal reciprocation signal in the cable 115. Accordingly, the delay detector 324 can check the time difference between the falling edge of the request signal 301 and the rising edge of the response signal 302 and can estimate a delay time, based on the time difference.

Figure 3B:
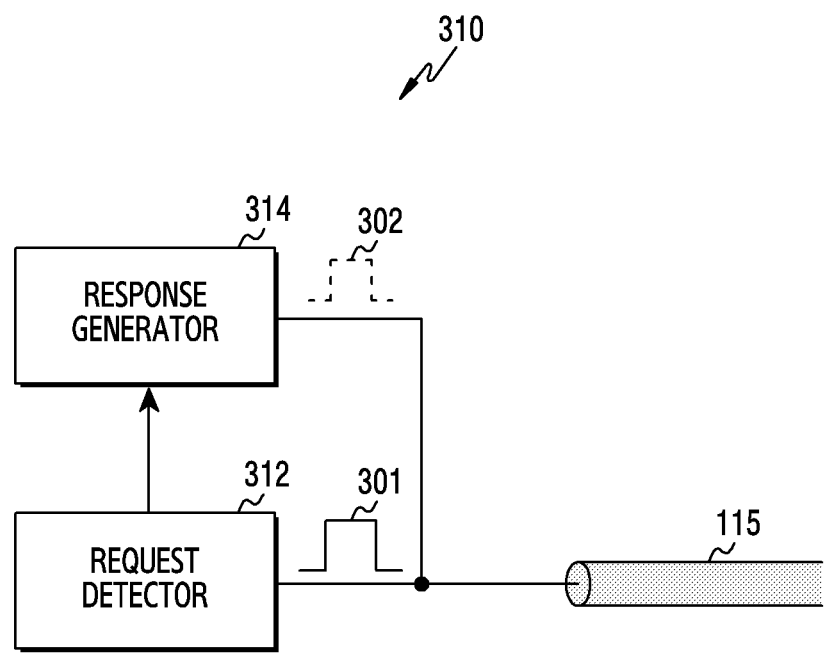
FIG. 3B shows a configuration of a response module in a synchronization system according to an embodiment of the disclosure.

FIG. 3B shows a configuration of a response module in a synchronization system according to an embodiment of the disclosure.

Referring to FIG. 3B, a response module 310 includes a request detector 312 and a response generator 314.

The request detector 312 detects the request signal 301 that is transmitted from a delay detection module (e.g., the delay detection module 320) and received through the cable 115. The request signal 301 may have a single pulse shape with a pre-defined length. That is, the request signal 301 may include a power signal that is temporarily generated. The request detector 312 can detect the request signal 301, based on the characteristic of the request signal 301. That is, the request detector 312 can detect that a power signal disappears after generated.

The response generator 314 generates and outputs the response signal 302 in response to detection of the request signal 301. The response signal 302 is transmitted to the delay detection module through the cable 115. For example, the response signal 302 may include a pulse signal having a predetermined magnitude and length. The magnitude of the response signal may be smaller than the magnitude of the request signal 301. The response signal 302 is, similar to the request signal 301, transmitted through the second path for a power signal rather than a specific control path, so it may be understood as a kind of power signal.

Figure 4:
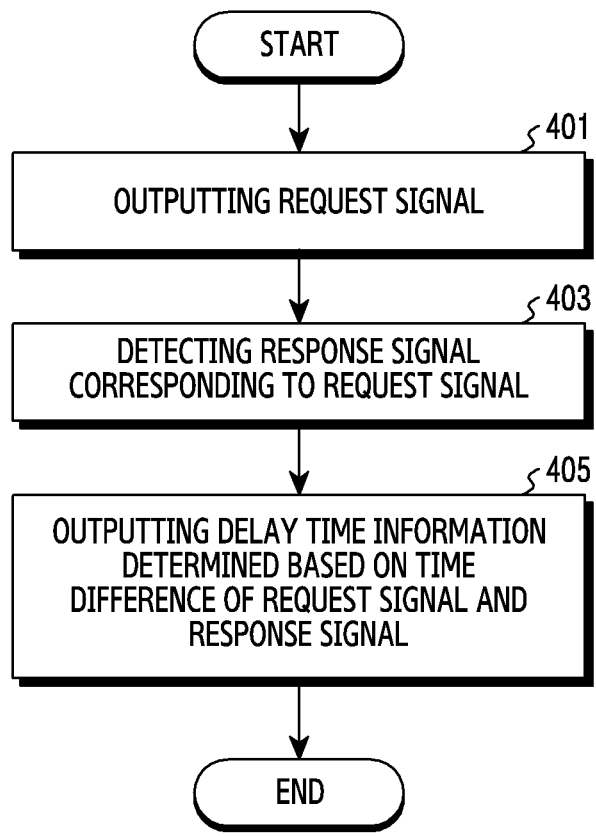
FIG. 4 shows an operation flow of a delay detection module in a synchronization system according to an embodiment of the disclosure.

FIG. 4 shows an operation flow of a delay detection module in a synchronization system according to an embodiment of the disclosure. FIG. 4 exemplifies an operation method of the delay detection module 320.

Referring to FIG. 4, in operation 401, the delay detection module outputs a request signal. The request signal may be a pulse type signal having a pre-defined length. For example, the request signal may include a power signal having a pre-defined length. The request signal is input to one end of the cable to be transmitted to the response module and is supplied to another circuit in the delay detection module connected to the other end of the cable. Accordingly, the delay detection module can find out the time when the request signal was generated.

In operation 403, the delay detection module detects a response signal corresponding to the request signal. When the request signal reaches the response module, a response signal is generated by the response module and is received by the delay detection module. The response signal is, similar to the request signal, received after passing through the cable and may be received through the path for a power signal. Accordingly, the delay detection module can stop output of a power signal until a response signal is received.

In operation 405, the delay detection module outputs information about a determined delay time, based on the time difference between the request signal and the response signal. That is, the delay detection module checks the time difference between the falling edge of the request signal and the rising edge of the response signal, estimates a delay time, based on the time difference, and outputs information about the delay time. The information about the time delay may be provided to a module that generates an SS or to a device (e.g., the synchronization device 130) that generates a clock signal using an SS.

In the embodiment described with reference to FIG. 4, the delay detection module estimates a delay time, based on the time difference between the request signal and the response signal. The delay detection module may further consider a time error in a circuit in addition to the time difference between the request signal and the response signal. The inside of the circuit, which is at least a part of not only the delay detection module and the response module, but also an antenna device (e.g., the antenna device 110 and a reception device (e.g., the reception device 120), includes at least one circuit that influences the request signal and the response signal. For example, the time difference may include at least one of time that is needed to detect a request signal, time that is needed to generate a response signal, time until a request signal is input to an end of a cable, and time until a response signal is input to the other end of the cable after being generated.

Figure 5:
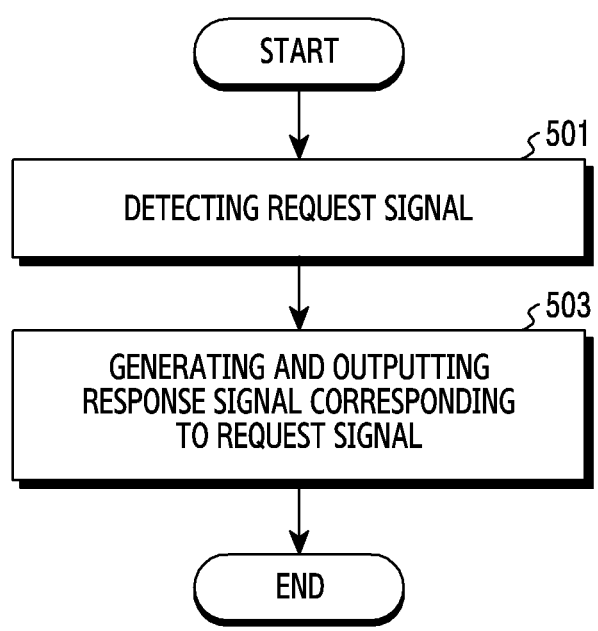
FIG. 5 shows an operation flow of a response module in a synchronization system according to an embodiment of the disclosure.

FIG. 5 shows an operation flow of a response module in a synchronization system according to an embodiment of the disclosure. FIG. 5 exemplifies an operation method of the response module 310.

Referring to FIG. 5, in operation 501, the response module detects a pulse type request signal. The request signal may be a pulse type signal having a pre-defined length. The request signal is generated by a delay detection module (e.g., the delay detection module 320) and is received after passing through the cable. For example, the request signal may include a power signal having a pre-defined length. In this case, the response module can detect the request signal by detecting a disappearance of a power signal.

In operation 503, the response module generates and outputs a response signal for the request signal. The response signal may be a pulse type signal having a predetermined magnitude and length. The response signal can be transmitted through a path for transmitting a power signal of the cable.

As described above, a delay time that is generated in a cable can be estimated by interaction between a delay detection module (e.g., the delay detection module 320) and a response module (e.g., the response module 310). In order to estimate a delay time in the cable, the delay detection module and the response module are disposed respectively at an end and the other end of the cable. According to various embodiments, the delay detection module and the response module may be implemented as separate devices or may be included in an antenna device (e.g., the antenna device 110) or a reception device (e.g., the reception device 120). Depending on what device the delay detection module and the response module are included in, a component for controlling a signal path may be further included. Various arrangement embodiments of the delay detection module and the response module are described hereafter.

Figure 6A:
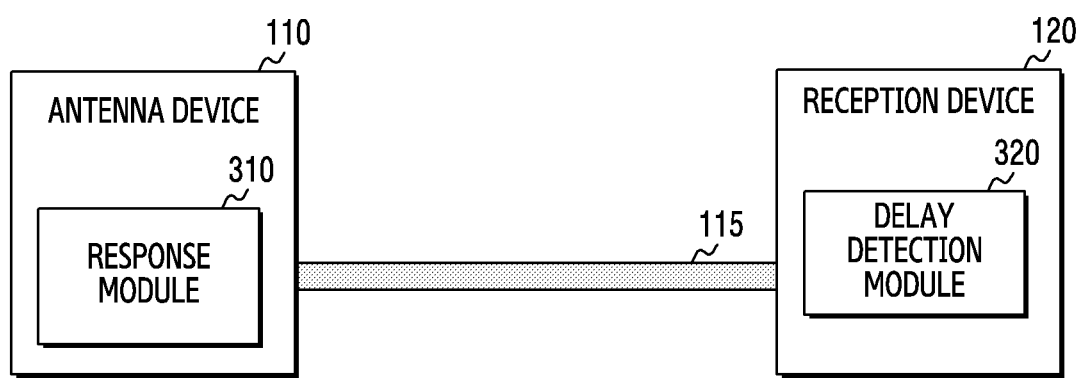
FIG. 6A shows an example arrangement of a response module and a delay detection module in a synchronization system according to an embodiment of the disclosure.
Figure 6B:
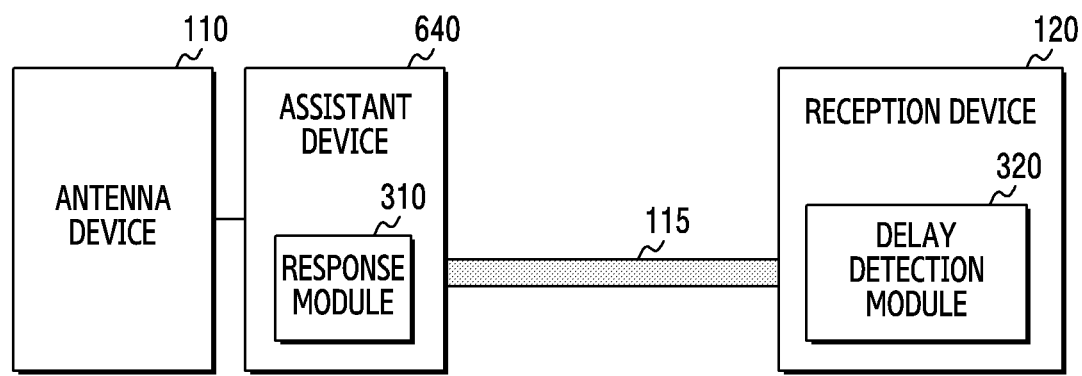
FIG. 6B shows an example of an arrangement of a response module and a delay detection module in a synchronization system according to an embodiment of the disclosure.
Figure 6C:
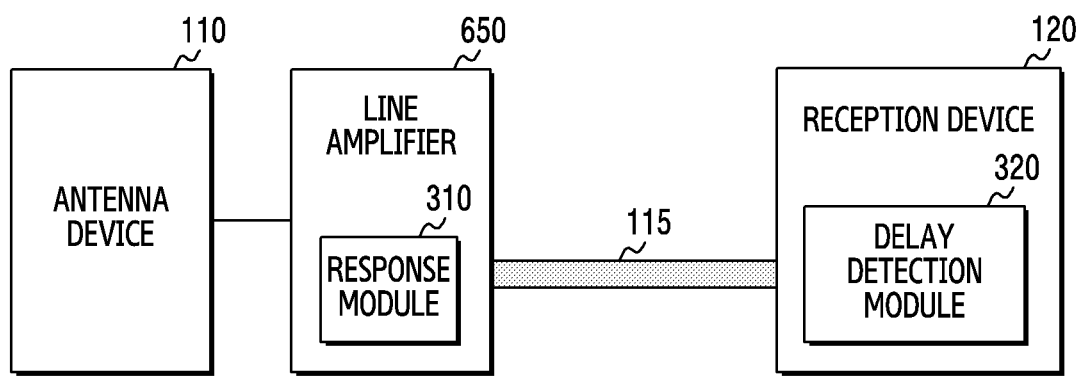
FIG. 6C shows an example of an arrangement of a response module and a delay detection module in a synchronization system according to an embodiment of the disclosure.

FIG. 6A shows an example arrangement of a response module and a delay detection module in a synchronization system according to an embodiment of the disclosure, FIG. 6B shows an example arrangement of a response module and a delay detection module in a synchronization system according to an embodiment of the disclosure, and FIG. 6C shows an example arrangement of a response module and a delay detection module in a synchronization system according to an embodiment of the disclosure.

Referring to FIG. 6A, FIG. 6A shows an example, in which the response module 310 is included in the antenna device 110 and the delay detection module 320 is included in the reception device 120. In this case, since the antenna device 110 includes the response module 310 and the reception device 120 includes the delay detection module 320, it is possible to estimate a delay time in the cable 115 by installing the antenna device 110 and the reception device 120 on the cable 115 instead of existing antenna device and reception device.

Referring to FIG. 6B, FIG. 6B shows an example, in which the response module 310 is included in an assistant device 640 and the delay detection module 320 is included in the reception device 120. In FIG. 6B, the assistant device 640 is a device designed to be able to be detached with an existing antenna device while the existing antenna sustains. Accordingly, it is possible to estimate a delay time in the cable 115 by adding the assistant device 640 without replacing the existing antenna device.

Referring to FIG. 6C, FIG. 6C shows an example, in which the response module 310 is included in a line amplifier 650 and the delay detection module 320 is included in the reception device 120. The line amplifier 650, which is a device for amplifying a signal at the middle of the transmission path when the antenna device 110 and the reception device 120 are apart over a distance that the antenna device 110 supports, is a type of a repeater or router. When the line amplifier 650 includes the response module 310, a delay time in the cable 115 can be estimated without replacing an existing antenna device in an environment requiring the line amplifier 650.

Hereafter, configurations of the reception device 120, the antenna device 110, the assistant device 640, and the line amplifier 650 according to arrangement embodiments of FIGS. 6A to 6C are described.

Figure 7:
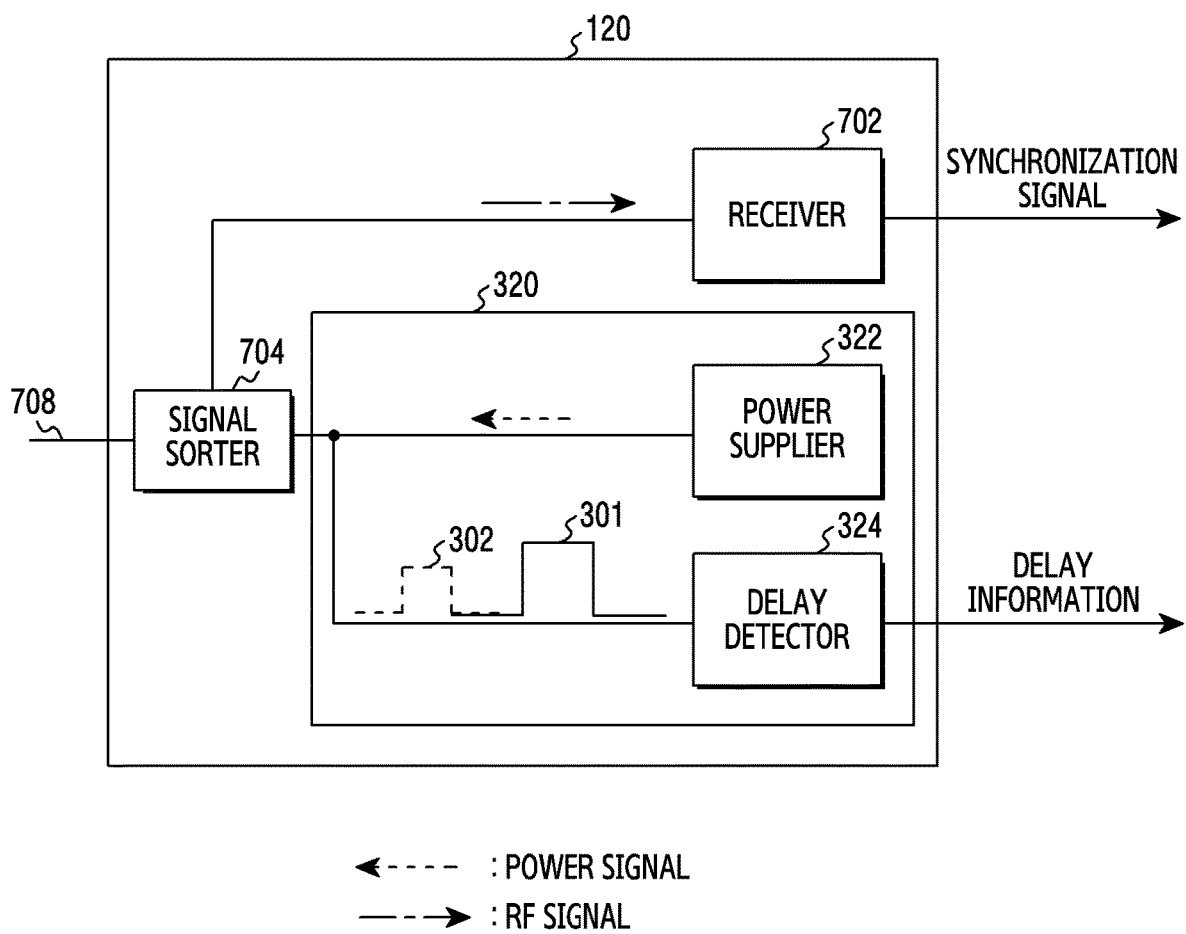
FIG. 7 shows a configuration of a reception device including a delay detection module in a synchronization system according to an embodiment of the disclosure.

FIG. 7 shows a configuration of a reception device including a delay detection module in a synchronization system according to an embodiment of the disclosure. The configuration exemplified in FIG. 7 may be understood as the configuration of the reception device 120.

Referring to FIG. 7, the reception device includes a receiver 702, a signal sorter 704, and the delay detection module 320.

The receiver 702 generates an SS using a satellite signal. The receiver 702 receives a satellite signal received by an antenna device (e.g., the antenna device 110) and generates an SS, based on the satellite signal. For example, the SS may include a pulse signal having a periodicity.

The signal sorter 704 sorts signal paths of a power signal and a radio frequency (RF) signal. The RF signal includes a satellite signal. The signal sorter 704 provides an RF signal of signals input to the reception device to the receiver 702 and provides a power signal to the delay detection module 320. The power signal is a direct current (DC) signal, so the signal sorter 704 may be implemented into an open element for a DC signal and an open element for an alternating current (AC) signal. For example, the signal sorter 704 can disconnect a terminal 708 and the receiver 702 for DC by including a capacitor connected between paths to the terminal 708 of the reception device 120 and the receiver 702. As another example, the signal sorter 704 can disconnect the terminal 708 and the delay detection module 320 for AC by including an inductor connected between paths to the terminal 708 and the delay detection module 320. The signal sorter 704 may be referred to as a bias-T.

The delay detection module 320 includes the power supplier 322 and the delay detector 324. The power supplier 322 outputs a power signal. The power signal includes a power signal needed for operation of the antenna device 110 and the request signal 301 for estimating a delay. That is, the power supplier 322 can further perform a function that supplies power to the antenna device 110 in addition to the function of generating the request signal 301. The delay detector 324 estimates a delay time, based on the request signal 301 and the response signal 302 corresponding to the request signal 301.

According to the embodiment described with reference to FIG. 7, the response signal 302 is received after the request signal 301 is transmitted. The response signal 302 is received through a path for a power signal, so when a power signal generated by the power supplier 322 is output, the delay detector 324 may not detect the response signal 302. Accordingly, the delay detection module 320 may further include a controller that stops output of the power signal in a period until the response signal 302 is received after the request signal 301 is output. The controller may be a separate component or may be a part of the receiver 702.

Figure 8A:
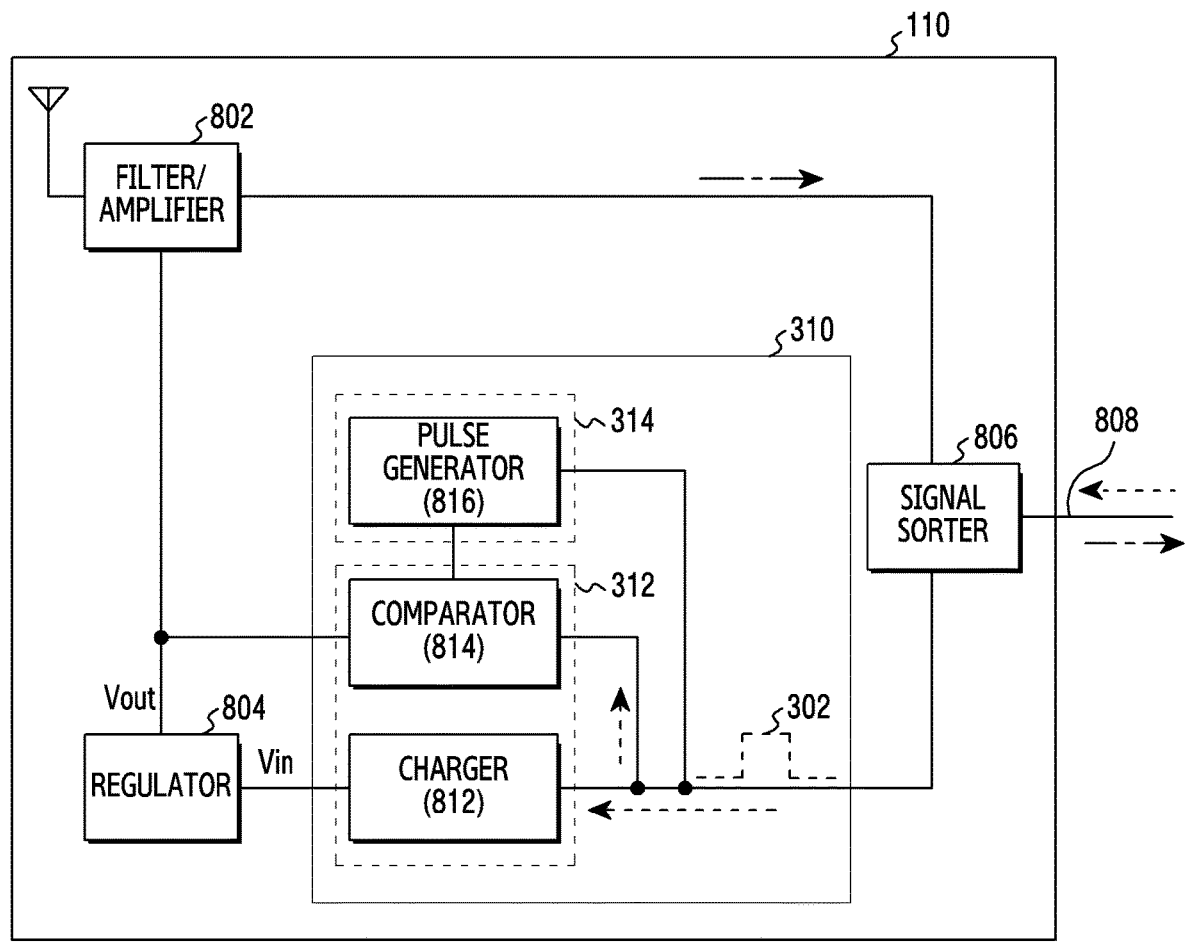
FIG. 8A shows a configuration of an antenna device including a response module in a synchronization system according to an embodiment of the disclosure.

FIG. 8A shows a configuration of an antenna device including a response module in a synchronization system according to an embodiment of the disclosure. The configuration exemplified in FIG. 8A may be understood as the configuration of the antenna device 110.

Referring to FIG. 8A, an antenna device includes a filter/amplifier 802, a regulator 804, a signal sorter 806, and the response module 310.

The filter/amplifier 802 filters out and amplifies signals that are received through an antenna. In detail, the filter/amplifier 802 acquires a satellite signal from received signals through filtering and amplifies the satellite signal.

The regulator 804 generates and supplies power needed for operation of the filter/amplifier 802. The regulator 804 converts a power signal having voltage Vin and provided from a charger 812 into a signal having voltage Vout and provides the converted voltage to the filter/amplifier 802. Though not shown in FIG. 8A, the regulator 804 can supply power to at least one active element (e.g., a pulse generator 816) other than the filter/amplifier 802.

The signal sorter 806 sorts signal paths of a power signal and an RF signal. The RF signal includes a satellite signal. The signal sorter 806 provides power signal of signals, which are input to the antenna device 110, to the response module 310 and outputs a satellite signal provided from the filter/amplifier 802 to a cable. The power signal is a DC signal, so the signal sorter 806 may be implemented into an open element for a DC signal and an open element for an AC signal. For example, the signal sorter 806 can disconnect a terminal 808 and the filter/amplifier 802 for DC by including a capacitor connected between paths to the terminal 808 of the antenna device 110 and the filter/amplifier 802. As another example, the signal sorter 806 can disconnect the terminal 808 and the response module 310 for AC by including an inductor connected between paths to the terminal 808 and the response module 310. The signal sorter 806 may be referred to as a bias-T.

The response module 310 includes the request detector 312 and the response generator 314, the request detector 312 includes the charger 812 and a comparator 814, and the response generator 314 includes the pulse generator 816.

The charger 812 is charged using a request signal input through the signal sorter 806 and provides the accumulated power to the regulator 804. To this end, the charger 812 may include at least one capacitor. When a request signal has a pulse type having a predetermined length, even if the request signal disappears, the charger 812 can temporarily supply power to the regulator 804 and the regulator 804 can output a signal having voltage Vout. Accordingly, even if a power signal is stopped, power needed for operation of the response module 310 can be secured for a predetermined period.

The comparator 814 compares the magnitudes of an output signal of the regulator 804 and an input signal of the charger 812. The comparator 814 instructs the pulse generator 816 whether to generate a response signal, based on the magnitude of the signal input to the charger 812. That is, when the output signal of the regulator 804 is larger than the input signal of the charger 812, the comparator 814 triggers the operation of the pulse generator 816. When the request signal disappears, the input signal of the charger 812 becomes 0, but the output of the regulator 804 can be temporarily maintained. It is detected that the output signal of the regulator 804 is larger than the input signal of the charger 812 by comparison by the comparator 814. Accordingly, existence of a general power signal that is continuously maintained and another request signal is detected. In FIG. 8A, the comparator 814 compares the magnitudes of the output signal of the regulator 804 and the input signal of the charger 812, but according to another embodiment, the comparator 814 may be configured to compare the magnitudes of the output signal of the charger 812 and the input signal of the charger 812.

The pulse generator 816 generates a pulse signal, that is, a response signal in response to a determination of the comparator 814. That is, turning-off is detected after power is applied to the antenna device 110 by the comparator 814, the pulse generator 816 generates a pulse signal having a pre-defined type. The response signal generated by the pulse generator 816 is transmitted to the delay detection module 320 through the signal sorter 806 and a cable.

Figure 8B:
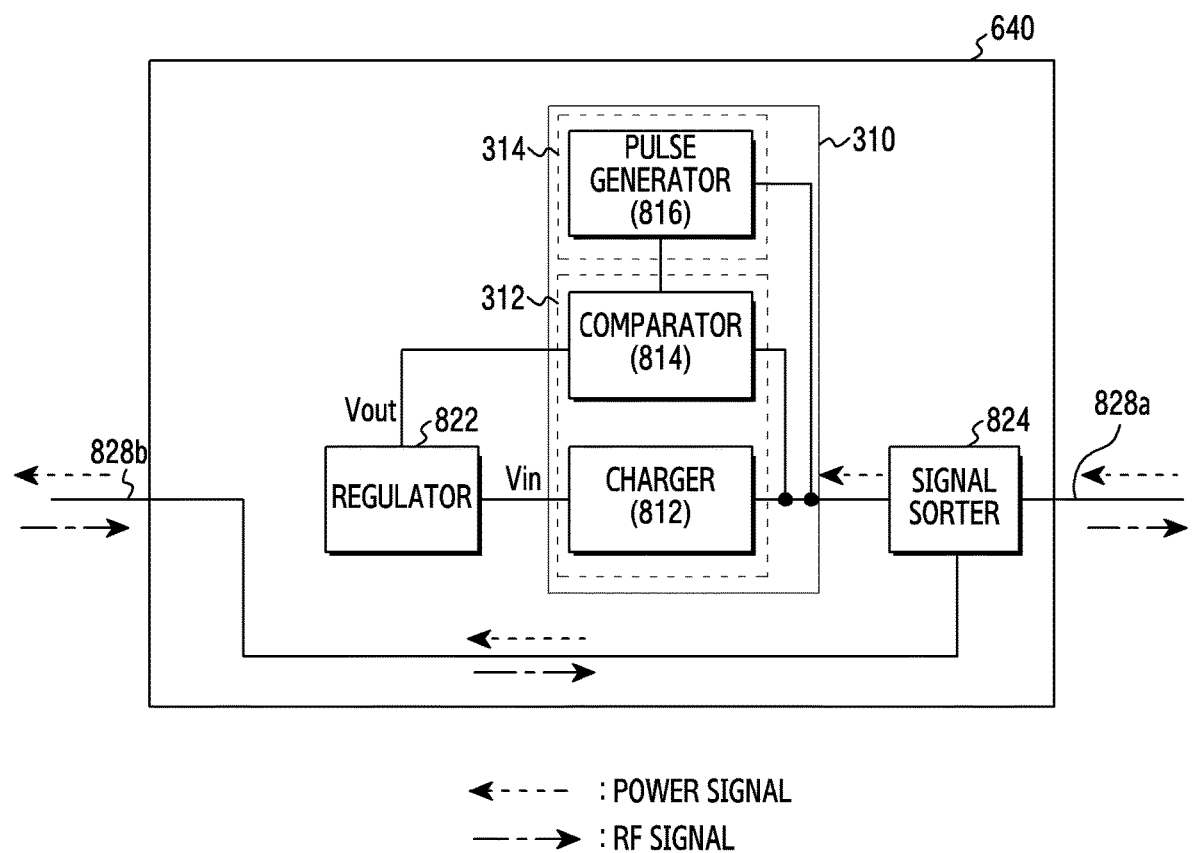
FIG. 8B shows a configuration of an assistant device including a response module in a synchronization system according to an embodiment of the disclosure.

FIG. 8B shows a configuration of an assistant device including a response module in a synchronization system according to an embodiment of the disclosure. The configuration exemplified in FIG. 8B may be understood as the configuration of the assistant device 640.

Referring to FIG. 8B, the assistant device 640 includes a regulator 822, a signal sorter 824, and the response module 310.

The regulator 822 converts a power signal having voltage Vin and provided from the charger 812 into a signal having voltage Vout and provides the converted voltage to the comparator 814. Though not shown in FIG. 8B, the regulator 822 can supply power to at least one active element (e.g., the pulse generator 816).

The signal sorter 824 sorts signal paths of a power signal and an RF signal. The RF signal includes a satellite signal. The signal sorter 824 provides a power signal of signals input to the assistant device 640 to the response module 310. The power signal is a DC signal, so the signal sorter 824 may be implemented into an open element for a DC signal and an open element for an AC signal. For example, the signal sorter 824 can disconnect a first terminal 828a and the response module 310 for AC by including an inductor connected between paths to the first terminal 828a, which goes to the reception device 120, and the response module 310. The signal sorter 824 may be referred to as a bias-T. The first terminal 828a diverges before it is connected to the signal sorter 824, and is then connected to a second terminal 828b. Accordingly, a power signal and an RF signal can pass through the assistant device 640.

The response module 310 includes the request detector 312 and the response generator 314, the request detector 312 includes the charger 812 and the comparator 814, and the response generator 314 includes the pulse generator 816. The charger 812 is charged using a request signal input through the signal sorter 824 and provides the accumulated power to the regulator 822. The comparator 814 compares the magnitudes of an output signal of the regulator 822 and an input signal of the charger 812. When the output signal of the regulator 822 is larger than the input signal of the charger 812, the comparator 814 triggers the operation of the pulse generator 816. The pulse generator 816 generates a pulse signal, that is, a response signal in response to determination of the comparator 814. The response signal generated by the pulse generator 816 is transmitted to the delay detection module 320 through the signal sorter 824 and a cable.

Figure 8C:
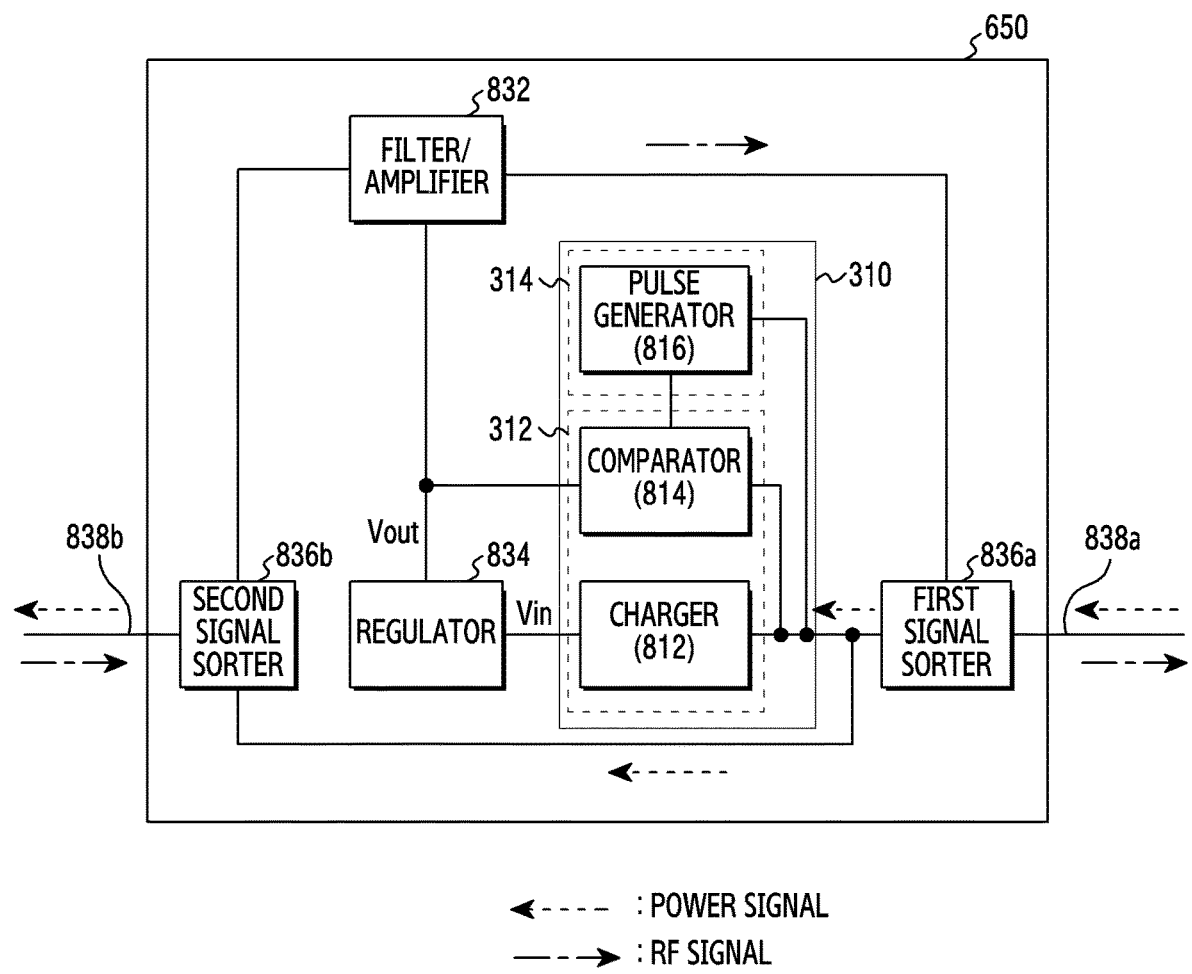
FIG. 8C shows a configuration of a line amplifier including a response module in a synchronization system according to an embodiment of the disclosure.

FIG. 8C shows a configuration of a line amplifier including a response module in a synchronization system according to an embodiment of the disclosure. The configuration exemplified in FIG. 8C may be understood as the configuration of the line amplifier 650.

Referring to FIG. 8C, the line amplifier 650 includes a regulator 834, a first signal sorter 836a, a second signal sorter 836b, a filter/amplifier 832, and the response module 310.

The filter/amplifier 832 filters out and amplifies signals that are received through an antenna. In detail, the filter/amplifier 832 acquires a satellite signal from received signals through filtering and amplifies the satellite signal.

The regulator 834 generates and supplies power needed for operation of the filter/amplifier 832. The regulator 804 converts a power signal having voltage Vin and provided from the charger 812 into a signal having voltage Vout and provides the converted voltage to the filter/amplifier 802. Though not shown in FIG. 8C, the regulator 804 can supply power to at least one active element (e.g., the pulse generator 816) other than the filter/amplifier 802.

The first signal sorter 836a sorts signal paths of a power signal and an RF signal. The RF signal includes a satellite signal. The first signal sorter 836a provides a power signal of signals input to the line amplifier 650 to the response module 310 and the second signal sorter 836b and outputs a satellite signal provided from the second signal sorter 836b to a cable. The power signal is a DC signal, so the first signal sorter 836a may be implemented into an open element for a DC signal and an open element for an AC signal. For example, the first signal sorter 836a can disconnect a first terminal 838a and the response module 310 for AC by including an inductor connected between paths to the first terminal 838a of the line amplifier 650, which goes to the reception device 120, and the response module 310. The first signal sorter 836a may be referred to as a bias-T.

The second signal sorter 836b sorts signal paths of a power signal and an RF signal. The RF signal includes a satellite signal. The second signal sorter 836b provides a satellite signal of signals input to the line amplifier 650 to the filter/amplifier 836 and outputs a power signal provided from the first signal sorter 836a to a second terminal 838b. For example, the second signal sorter 836b can disconnect the second terminal 838b and the response module 310 for DC by including a capacitor connected between paths to the second terminal 838b and the filter/amplifier 836. The second signal sorter 836b can disconnect the second terminal 838b and the response module 310 for AC by including an inductor connected between paths to the second terminal 838b and the first signal sorter 836a. The second signal sorter 836b may be referred to as a bias-T.

The response module 310 includes the request detector 312 and the response generator 314, the request detector 312 includes the charger 812 and the comparator 814, and the response generator 314 includes the pulse generator 816. The charger 812 is charged using a request signal input through the first signal sorter 836a and provides the accumulated power to the regulator 834. The comparator 814 compares the magnitudes of an output signal of the regulator 834 and an input signal of the charger 812. When the output signal of the regulator 834 is larger than the input signal of the charger 812, the comparator 814 triggers the operation of the pulse generator 816. The pulse generator 816 generates a pulse signal, that is, a response signal in response to determination of the comparator 814. The response signal generated by the pulse generator 816 is transmitted to the delay detection module 320 through the first signal sorter 836a and a cable.

Figure 9:
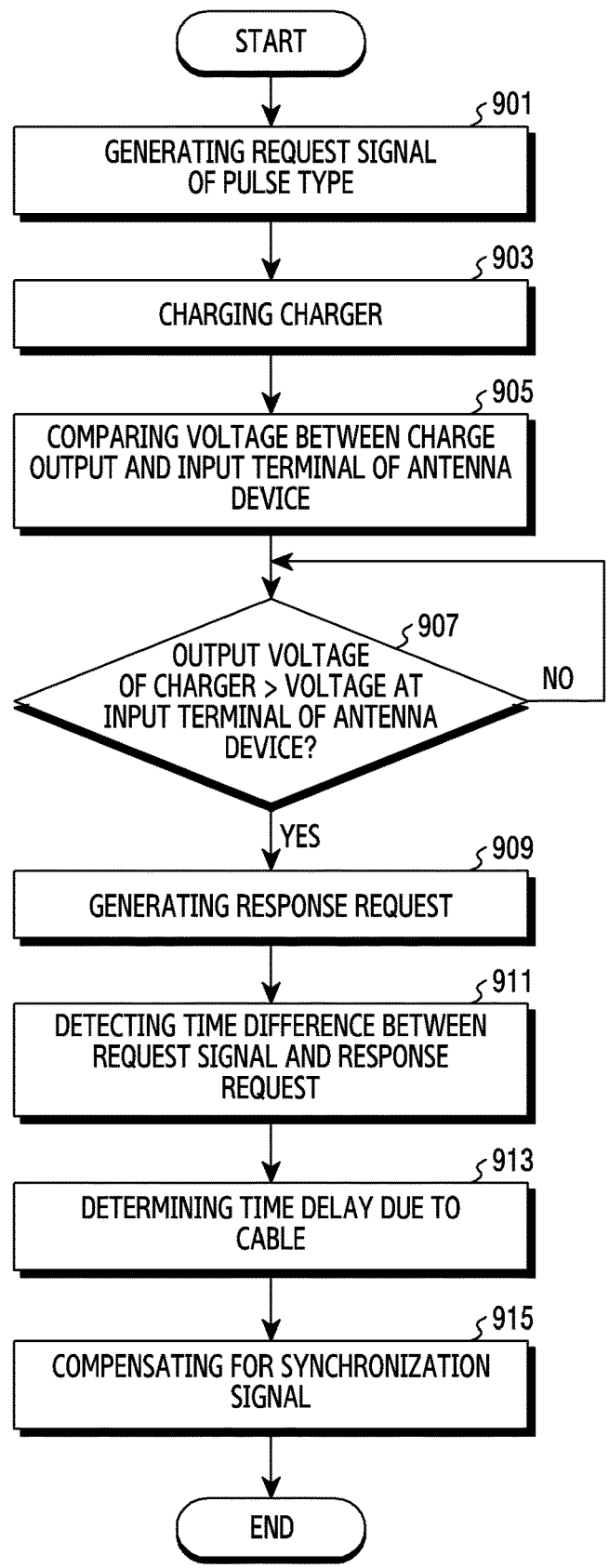
FIG. 9 shows an operation flow for generating a synchronization signal in a synchronization system according to an embodiment of the disclosure.

FIG. 9 shows an operation flow for generating an SS in a synchronization system according to an embodiment of the disclosure. FIG. 9 exemplifies an operation method of the delay detection module 320 and the response module 310.

Referring to FIG. 9, in operation 901, the delay detection module generates a request signal having a pulse type. The delay detection module can generate a request signal including a power signal having a positive pulse type by turning on a power supplier (e.g., the power supplier 322) for a predetermined period and then turning it off. The request signal is provided to the response module through a cable (e.g., the cable 115).

In operation 903, the response module charges a charger (e.g., the charger 812). As the request signal supplies power to the charger, the charger is charged.

In operation 905, the response module compares voltages between an output of the charger and an input terminal (e.g., the terminal 808) of the antenna device. The response module can compare the voltage accumulated in the charger and the power at the input terminal at the point in timing when the positive pulse supplied from the delay detection module disappears. In operation 907, the response module determines whether the output voltage of the charger is larger than the voltage at the input terminal of the antenna device.

When the output voltage of the charger is larger than the voltage at the input terminal of the antenna device, in operation 909, the response module generates a response pulse. That is, the response module can generate a response signal including a pulse signal by enabling a pulse generator (e.g., the pulse generator 816). That is, the antenna device determines turning-off of a power signal received from the reception device, and accordingly, generates a pulse signal. The generated pulse signal is output to the input terminal of the antenna device, passes through the cable, and is then transmitted to the delay detection module.

In operation 911, the delay detection module detects a time difference between a request signal and a response signal. That is, when a request signal and a response signal are applied to the delay detector in the delay detection module, the delay detector estimates the time difference between the negative pulse of the request signal and the positive pulse of the response signal.

In operation 913, the delay detection module determines the delay time due to the cable. The time difference between the two pulses, that is, the request signal and the response signal, includes the delay time generated in the cable and an error generated in other circuits. The error generated in a circuit can be found out through calibration in advance, so the delay detection module can store a delay offset corresponding to the error found out in advance, and can determine the delay time due to the cable using the stored delay offset.

In operation 915, the reception device or the synchronization device compensates for an SS. According to an embodiment, the reception device can compensate for a delay time when generating an SS. In this case, the reception device provides an SS with the compensated delay time to the synchronization device and additional operation of the synchronization device is not required. According to another embodiment, the reception device provides an SS and delay time information to the synchronization device, and the synchronization device can generate a clock signal after compensating for the SS. Alternatively, the synchronization device can generate a clock signal and then compensate for the clock signal, based on the delay time information.

As described in various embodiments above, in order to estimate a delay time that is generated in a cable between an antenna device and a reception device, the reception device controls a power signal and the antenna device performs a series of processes including charging, sensing, and generating a pulse, whereby the reception device can estimate the delay time. To this end, the antenna device may include hardware that, similar to the response module described above (e.g., the response module 310), is charged using a power signal, compares internal power and input power signal, and generates a pulse signal. The reception device may include hardware that, similar to the delay detection module described above (e.g., the delay detection module 320), controls power to generate a request signal and estimates a delay time, based on a response signal from the antenna device.

The request signal and the response signal are both transmitted to a path for a power signal in a cable. Accordingly, a power signal from the reception device is turned off and a response signal is generated by the antenna device so that a mutual signal can be transmitted from one transmission medium. Accordingly, a delay time can be estimated by controlling only input of a power signal without operation of a separate control processor or software in the antenna device and the reception device.

According to various embodiments described above, it is possible to estimate a delay time generated in a cable and improve precision of an SS using the estimated delay time. The technology according to various embodiments makes it possible to estimate a delay time in real time even if an antenna device and a reception device are installed. Further, the technology according to various embodiments does not require replacement of an existing line, so it has an advantage in terms of cost.

Methods according to embodiments stated in claims and/ or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first apparatus in a synchronization system, the first apparatus comprising:
   a detector configured to detect a request signal generated by a second apparatus,
   wherein the detector comprises:
      a charger configured to be charged by the request signal and output a signal to a regulator after being charged, and
      a comparator configured to instruct a generator whether to generate a response signal based on a magnitude of a signal input to the charger and a magnitude of a signal output from the regulator,
   wherein the generator is configured to:
      generate the response signal corresponding to the request signal, and
      output the response signal,
   wherein the request signal is received from the second apparatus through a cable, and
   wherein the response signal is transmitted to the second apparatus through the cable.

2. The first apparatus of claim 1,
   wherein the request signal includes a power signal having a pre-defined length, and
   wherein the detector is further configured to detect a disappearance of the power signal.

3. The first apparatus of claim 1, further comprising:
   an amplifier configured to amplify an external signal received through an antenna; and
   the regulator configured to supply a power to the amplifier,
   wherein the regulator is further configured to convert a first power signal provided from the detector into a second power signal for operation of the amplifier.

4. The first apparatus of claim 1, further comprising:
   a signal sorter positioned between the second apparatus and an antenna device which is configured to receive a satellite signal, wherein the signal sorter is configured to sort signal paths of a power signal and the satellite signal by providing the power signal to a response module and the satellite signal to the cable,
   wherein the regulator is configured to convert a power signal provided from the detector into a signal having a pre-defined voltage, and
   wherein the detector is further configured to detect the request signal based on an output of the regulator.

5. The first apparatus of claim 1, further comprising:
   an amplifier configured to amplify a first satellite signal provided from an antenna device, the antenna device comprising an antenna configured to receive the first satellite signal;
   and
   a signal sorter positioned between the second apparatus and the antenna device,
   wherein the signal sorter is configured to:
      sort signal paths of a power signal and the first satellite signal by providing the power signal to a response module and the first satellite signal to the cable, and
      provide a second power signal provided from the second apparatus to the detector, and
   wherein the regulator is further configured to convert a third power signal provided from the detector into a fourth power signal for operation of the amplifier.

6. A method performed by a first apparatus in a synchronization system, the method comprising:
   detecting, by a detector, a request signal generated by a second apparatus;
   charging, by a charger, a power based on the request signal and outputting a signal to a regulator after being charged;
   instructing, by a comparator, a generator whether to generate a response signal based on a magnitude of a signal input to the charger and a magnitude of a signal output from the regulator;
   generating, by the generator, the response signal corresponding to the request signal; and
   outputting, by the generator, the response signal,
   wherein the request signal is received from the second apparatus through a cable, and
   wherein the response signal is transmitted to the second apparatus through the cable.

7. The method of claim 6,
   wherein the request signal comprises a power signal having a pre-defined length, and
   wherein the detecting of the request signal includes detecting a disappearance of the power signal.

8. The method of claim 6, further comprising:
   supplying, by the regulator, a power to an amplifier;
   amplifying, by the amplifier, an external signal received through an antenna; and
   converting, by the regulator, a first power signal provided from the detector into a second power signal for operation of the amplifier.

9. The method of claim 6, further comprising:
   sorting, by a signal sorter positioned between the second apparatus and an antenna device which is configured to receive a satellite signal, signal paths of a power signal and the satellite signal by providing the power signal to a response module and the satellite signal to the cable; and
   converting, by the regulator, a power signal provided from the detector into a signal having a pre-defined voltage,
   wherein the request signal is detected based on an output of the regulator.

10. The method of claim 6, further comprising:
   amplifying, by an amplifier, a first satellite signal provided from an antenna device, the antenna device comprising an antenna configured to receive the first satellite signal;
   sorting, by a signal sorter positioned between the second apparatus and the antenna device, signal paths of a power signal and the first satellite signal by providing the power signal to a response module and the first satellite signal to the cable;
   providing, by the signal sorter, a second power signal provided from the second apparatus to the detector; and
   converting, by the regulator, a third power signal provided from the detector into a fourth power signal for operation of the amplifier.

* * * * *